United States Patent [19]
Helmer et al.

[11] Patent Number: 5,009,789
[45] Date of Patent: Apr. 23, 1991

[54] METHOD AND PLANT FOR SEPARATION OF SYNTHETIC WATER SOLUBLE POLYMERS

[75] Inventors: Ulla K. E. Helmer, Sollentuna; Karl-Erland M. Stensiö, Järfälla, both of Sweden

[73] Assignee: EKA Nobel, Surte, Sweden

[21] Appl. No.: 375,015

[22] PCT Filed: Dec. 29, 1987

[86] PCT No.: PCT/SE87/00637
§ 371 Date: Jun. 22, 1989
§ 102(e) Date: Jun. 22, 1989

[87] PCT Pub. No.: WO88/05444
PCT Pub. Date: Jul. 28, 1988

[30] Foreign Application Priority Data
Jan. 19, 1987 [SE] Sweden ............... 8700187

[51] Int. Cl.$^5$ .................................. B01D 61/20
[52] U.S. Cl. ........................... 210/641; 210/651; 210/652; 210/195.2; 210/259
[58] Field of Search ............ 210/636, 651, 195.2, 210/641, 259, 652; 204/186.7

[56] References Cited
U.S. PATENT DOCUMENTS 3,565,256 2/1971 Coeffler .................... 210/445 X
3,567,031 3/1971 Loeffler .................... 210/445 X
4,159,251 6/1979 Wrasidlo et al. ........... 264/41 X
4,308,121 12/1981 Hazen ....................... 204/181.7
4,340,702 7/1982 Huddleston, Jr. et al. .... 526/212 X FOREIGN PATENT DOCUMENTS
0062980 5/1979 Japan ....................... 210/644

OTHER PUBLICATIONS
Chemical Abstracts 103:124428k.
Chemical Abstracts 103:23285f.

Primary Examiner—Frank Spear
Attorney, Agent, or Firm—Fred Philpitt

[57] ABSTRACT

Aqueous solutions of water soluble synthetic resins, such as urea-formaldehyde resins, are charged to an ultrafiltration membrane unit (2) for separation into a concentrate (C) solution and a permeate (P) solution. The permeate solution is recirculated to a polymerization reactor (1), preferably after first having been subjected to reverse osmosis for upgrading of the permeate. A plant for production and separation of synthetic water soluble resins comprises a polymerization reactor (1) and an ultrafiltration membrane unit (5) whereby the permeate outlet (P) of the ultrafiltration unit is connected with the polymerization reactor, preferably via a reverse osmosis unit (10).

16 Claims, 1 Drawing Sheet

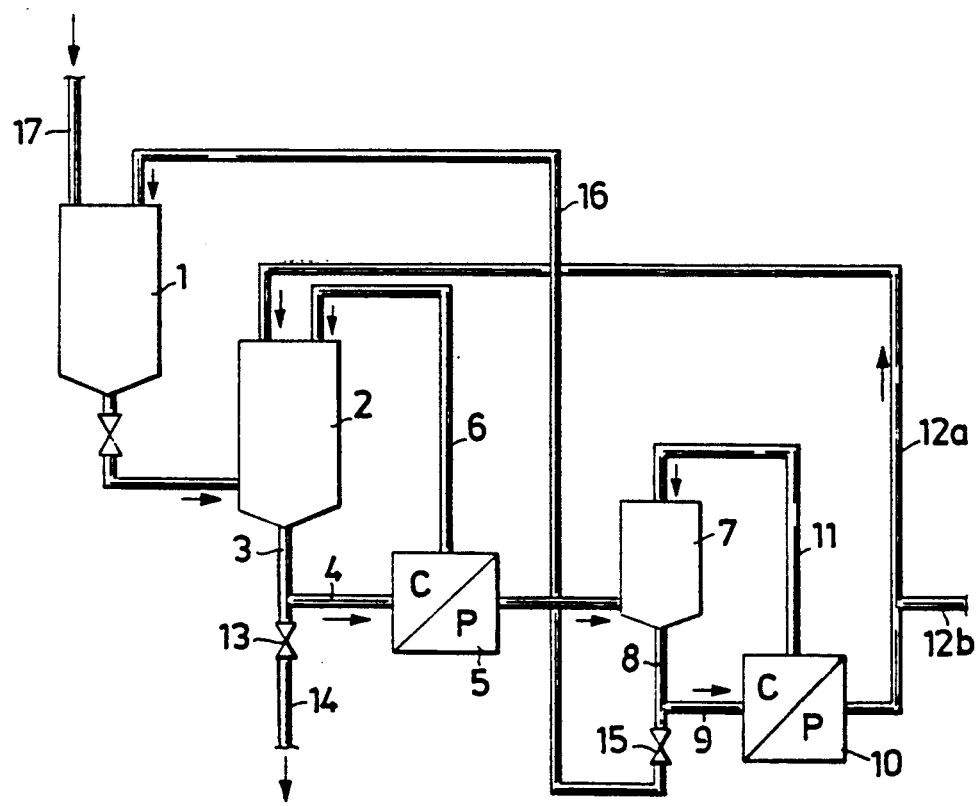

METHOD AND PLANT FOR SEPARATION OF SYNTHETIC WATER SOLUBLE POLYMERS

The present invention relates to a method for separation of synthetic water soluble polymers by a filtration process into two solutions, one of which is recirculated for re-polymerization. The invention also relates to a plant comprising a polymerization reactor and a unit for separation of produced synthetic water soluble polymers.

Natural polymers such as proteins, latex of natural rubber, cellulose etc often have very well defined molecular weights. In contrast to this synthetic polymers usually have a broad molecular weight distribution and in many cases only the fractions containing polymer of high molecular weight have the for the intended use desired favourable properties. It is not always possible to control polymer synthesis with available technology in order to obtain only the desired high molecular weight fractions. In addition to undesired low molecular weight polymer and byproducts, unreacted monomers are also often present in the synthesized resins.

The present invention offers a method for separation of synthetic water soluble polymers to obtain the desired high molecular weight fractions with advantageous properties and the method further includes recirculation of the low molecular weight fraction to a polymerization step.

The molecular weight of synthetic polymers depends on several variables such as monomers, type of polymer reaction, reaction time and temperature etc. For polymers in solution the molecular weight distribution nearly always has the form of a curve. The curve will of course vary from polymer to polymer and may have one or more peaks. It has, for example, been found that water soluble urea-formaldehyde resins have a molecular weight distribution with two clearly defined and specific peaks. According to the present method the desired high molecular weight fraction of such a resin can be separated from the undesired ones which can be re-used.

The method of the present invention is generally applicable to separation of desired high molecular weight fractions of any water soluble synthetic resin. However, the method is particularly advantageous for water soluble resins used in paper production and the following discussion will thus be directed, although not limited, to such resins.

Water soluble resins used in paper production are for example urea-formaldehyde resins, melamine-formaldehyde resins and polyamidoamine-epichlorohydrin resins. These resins are used as wet strength agents for paper and it has been found that the effect on the wet strength is obtained only by the high molecular weight fraction. The low molecular weight fraction is not retained in the paper, but circulated in the closed white water system. For formaldehyde based resins the high temperature of the water results in hydrolysis of this low molecular weight fraction and release of free formaldehyde which may cause environmental problems. Polyamidoamine-epichlorohydrin resins have a higher molecular weight than the formaldehyde based resins and the low molecular weight fraction of this resin also has a lower effect on the wet strength. Further, these resins contain monomeric chlorinated byproducts which also may cause environmental problems.

When the above described resins are treated according to the method of the invention solutions of high molecular weight polymers are obtained which give a very good wet strength effect and which also give a considerable reduction of formaldehyde and other non-desired compounds in the water and air at paper mills.

Since urea-formaldehyde resins are the predominant wet strength resins and also those which tend to cause the severest environmental problems their upgrading according to the invention is of particular importance and these resins will thus be discussed more in detail. As stated above, free formaldehyde is released from urea-formaldehyde resins at paper production due to hydrolysis. Further, the utilized original resins always contain free formaldehyde as well and this is accumulated and circulated in the white water system. Since all concentrated solutions obtained by the separation according to the invention are more effective, compared with the original resin, the added amount required for a certain wet strength effect is thus considerably reduced. The content of unreacted monomers, for example formaldehyde, and low molecular weight byproducts is also lower in a concentrate solution than in the original resin which leads to a double reduction of unwanted products in the white water system. As an example it can be mentioned that an original urea-formaldehyde resin may contain 7% free formaldehyde, based on the dry weight of the resin, and a concentrate solution of the same urea-formaldehyde resin obtained according to the present method will contain only about 4%. Normally added amounts of urea-formaldehyde resins during paper production are 10 to 20 kg per ton paper. Using a concentrate of the invention the same wet strength effect is obtained with only 6 to 12 kg dry weight resin. This means that "added" free formaldehyde is reduced from 0.7 to 1.4 kg to 0.24 to 0.48 kg, ie a reduction with 60 to 70%. This reduction is further increased by the fact that the concentrate contains much less of easily hydrolyzed low molecular weight resin. Likewise, for anionic bisulphite modified urea-formaldehyde resins which, as has been found, contain nearly half of the sulphur amount in monomeric products with formaldehyde can be treated according to the present method to remove these products which, besides not having any wet strength effect, are detrimental to the z-potential of the stock. Use of the present method for separation of the desired high molecular weight fraction of urea-formaldehyde, and melamine-formaldehyde resins, thus not only leads to an effective wet strength resin product but also to such a product which is advantageous from an environmental and occupational point of view.

The method of the invention further comprises recirculation of the at the separation obtained solution of low molecular weight compounds for re-polymerization. This recirculation for re-polymerization is preferably carried out after an upgrading step. The invention thus offers a technically and commercially advantageous method of producing desirable high molecular weight fractions of water soluble synthetic polymers while at the same time providing for re-use of the low molecular weight fraction.

According to the present invention an aqueous feed solution of a water soluble synthetic resin is charged to an ultra-filtration membrane unit in which the feed solution is separated into two solutions, a concentrate, which mainly comprises the polymer molecules with high molecular weight, and a permeate, which comprises the polymer molecules of low molecular weight, monomers and byproducts, said permeate subsequently being recirculated to a polymerization step.

In the ultrafiltration unit membranes with a suitable cut-off for retention of the desired high molecular weight fractions are used and these will of course vary with the specific polymer and the desired fractions. Suitable types of membranes are for example polysulphones, cellulose acetates, polyamides, vinyl chloride-acrylonitrile copolymers and poly(vinylidene fluoride) membranes. The membrane units may for example have the form of plate-and-frame modules, but other types of membrane units can of course also be used. The membranes are suitably subjected to a pre-treatment with a diluted solution of the actual resin to be separated prior to the separation which helps in forming a secondary membrane layer. For urea-formaldehyde resins the desired high molecular weight fraction is in the range of 2000 to 4000 and the separation is thus carried out to give essentially this fraction as the membrane-retained component, ie as the concentrate or retentate. As a guide it can be mentioned that for this separation membranes of the above mentioned type with cut-offs of 20000 to 200000 are suitably used. For other resins membranes with cut-offs in the range of 200000 to 400000 can generally be used.

The dry content of the feed solution to the ultrafiltration unit should usually be in the range of from 8 to 25 per cent by weight. The process is generally operated at pressures of about 1.0 to 15 bar and the flux through the membranes is increased by increased temperature. Care must however be taken that the chosen temperature is not harmful to the resin or the membrane. For membranes of the mentioned type and separation of for example urea-formaldehyde, melamine-formaldehyde and polyaminopolyamide-epichlorohydrin resins temperatures within the range of 30° to 45° C. are suitably used.

The filtration can advantageously be carried out in such a way that the concentrate from the membrane unit is recirculated to the same via a feed tank and made to pass the membrane unit a number of times until the desired degree of concentration is obtained. Alternatively, the concentrate can of course be subjected to treatment in several membrane units in series.

The aqueous solution containing polymer of lower molecular weight, the filtrate or permeate, obtained from the ultrafiltration unit, which in the following will be termed the UF-permeate, is brought back to the polymerization reactor for the original resin for re-polymerization to give an economic process without loss of material.

The separation in the ultra-filtration unit is suitably such that at least 5 per cent by weight of the original dry resin content, ie higher and lower molecular weight polymer fractions, is separated off in the permeate solution. Depending on the amount of material separated off in the permeate solution and the amount of water associated with this an upgrading step for the UF-permeate can be included before the recirculation to the polymerization reactor. If the amount is small, between about from 5 to 10 per cent by weight, the UF-permeate can be directly transferred for re-polymerization. Otherwise, an upgrading of the UF-permeate is suitably carried out in order not to disrupt the water balance in the polymerization-separation system too much and also to avoid building up unacceptable amounts of unwanted products in this system.

According to a preferred embodiment of the present invention the UF-permeate solution is thus upgraded to remove at least part of the water from the solution of polymer material before its recirculation to polymerization. This upgrading can for example be carried out by evaporation or socalled reverse osmosis membrane filtration. The upgrading is preferably carried out by reverse osmosis as this process is comparatively cheap and advantageous with regard to the low thermal load on the polymer material in the UF-permeate. The reverse osmosis process is also advantageous with regard to the separation of unreacted monomers and byproducts, such as for example formaldehyde, which is obtained hereby. The concentrated UF-permeate obtained by reverse osmosis is utilized in synthesis of the resin, ie recirculated for re-polymerization, while the solution which has passed the membranes in the reverse osmosis unit, the reverse osmosis permeate which hereinafter will be termed the RO-permeate, can be transferred to a feed tank and at least part of it can then be used as dilution liquid during actual resin synthesis.

The treatment of the UF-permeate in a reverse osmosis membrane unit is carried out to remove part of the water contained therein and suitably to give a solution having a dry content of at least 25 per cent by weight. Suitable temperatures at the reverse osmosis are from about 30 to 50° C. and the pressure is suitably from about 20 to 60 bar. The membranes in the reverse osmosis unit may suitably consist of composite film material or polybenzimidazolone or cellulose acetate.

When the present method is used for formaldehyde based resins it is possible, and advantageous, to add a formaldehyde binding agent to the feed to the ultrafiltration step. This addition is made in order to further reduce the formaldehyde content in the final product. It is also advantageous to add a formaldehyde binding agent to the UF-permeate in order to bind more formaldehyde to the RO-concentrate product. In this manner the total load of free formaldehyde, in the products and the process, is further reduced. Preferably the formaldehyde binding agent is urea which forms dimethylolureas with the formaldehyde.

The present invention also relates to a plant comprising a polymerization reactor, a first membrane unit for fractionation and purification of water soluble synthetic resins and which preferably also comprises a second membrane unit for upgrading of the permeate from the separation whereby the permeate outlet of the first membrane unit is connected to the second membrane unit via a feed tank.

A plant comprising two separation units and incorporated within a plant for polymer synthesis according to the preferred embodiment of the invention will be described in detail below with reference to the attached drawing showing a schematic flow chart of such a plant.

The plant comprises a reactor 1 for synthesis of the water soluble polymer. The reactor is connected to a feed tank 2. From the feed tank 2 pipes 3 and 4 lead to an ultrafiltration unit 5. From the concentrate side, indicated by C, of the unit the high molecular weight fraction can be removed or the concentrate can via pipe 6 be returned to the feed tank 2 for subsequent further ultrafiltration. The permeate side, indicated by P, of the ultrafiltration unit is connected to a second feed tank 7 which in turn is connected by way of pipes 8 and 9 to the second membrane unit, the reverse osmosis unit 10. The permeate side of the reverse osmosis unit can be connected to feed tank 2 via pipe 12a and to a waste water treatment plant via pipe 12b while the concentrate side of the unit is connected to feed tank 7 by pipe 11 and connected to reactor 1 by valve 15 and pipe 16. From feed tank 2 high molecular weight product is obtained by pipe 3, valve 13 and pipe 14. Raw material for the resin synthesis is charged to reactor 1 via pipe 17. The actual synthesis of water soluble synthetic resins is a batch process but except for the polymerization the plant can be run continuously. Storage tanks which might be necessary, for example connected to pipes 6 and 12 and between unit 5 and tank 7, have not been shown in the drawing.

According to the drawing the plant is arranged to work in the following way, but other ways are also possible as disclosed earlier. The synthetic water soluble resin with a broad molecular weight distribution is produced in reactor 1 and brought to feed tank 2. In feed tank 2 water is added. The solution from feed tank 2 is passed to the ultrafiltration unit 5, where it is separated into two solutions. The permeate solution comprising water, low molecular weight polymer, unreacted monomers and byproducts, passes the membrane and is in the drawing led to the second feed tank 7. At low separation degrees this permeate solution could be led directly to the reactor. The main part of the solution remains on the inlet side, the concentrate side, of the membrane. To increase the concentration of this solution it can be led back to the feed tanks and by means of a pump, not shown in the drawing, once again forced to flow along the membrane surfaces in the ultrafiltration unit. When the solution has been treated in this way during a certain time, the product, the concentrated solution of desired high molecular weight polymer, is taken out from the feed tank by way of pipes 3 and 14.

The permeate obtained from the ultrafiltration membrane unit which is collected in the second feed tank 7 is brought to a second membrane unit 10 and concentrated by reverse osmosis. The concentrate of the UF-permeate is recirculated for a certain time and made to flow along the membranes in the unit to make the desired amount of water pass these. The final concentrate from the reverse osmosis unit is then returned to the reactor via pipes 8 and 15 and used as raw material for new production of resin. The solution which passes the membranes in the second membrane unit consists mainly of water and part of it can be reused in the polymerization step.

The invention is further illustrated in the following examples which, however, are not intended to limit the same. Parts and per cent relate to parts by weight and per cent by weight respectively, unless otherwise stated.

EXAMPLE 1

Water soluble cationic urea-formaldehyde resin was diluted with water until the concentration of the solution was 23% dry weight. 55.2 kg of this solution was concentrated on an ultrafiltration plant with membranes of the type UF-PS-20, i.e. membranes of polysulphone. The solution was made to pass the ultrafilters until a solution with a concentration of 37.9% was obtained. The amount of concentrated solution was 26.2 kg. 27.6 kg permeate, solution which had passed the membranes, with a dry weight content of 10% was collected. 2.64 kg dry weight resin had thus been separated from the original amount of 12.6 kg. The inlet pressure was 10 bar, the temperature 40° C. and the filtration was performed during 3 hours.

The amount of free formaldehyde in the original product was 6.85% based on dry weight resin i.e. 0.87 kg in the 55.2 kg solution. The free amount of formaldehyde in the concentrate was 4.1% on dry weight resin i.e. 0,41 kg and in the permeate 19.1% based on dry weight i.e. 0.53 kg. The difference between totally found amount of formaldehyde 0.94 kg and the added amount of 0.87 kg can be explained by a slight hydrolysis of the resin during the filtration.

EXAMPLE 2

Water soluble cationic urea-formaldehyde resin was diluted with water until the concentration of 8.1% dry weight. 68.8 kg of this solution was concentrated on an ultrafiltration plant with membranes of polysulphone. The solution was made to pass the ultrafilters until a solution with a concentration of 20.4% was achieved. The amount of concentrated solution obtained was 20.6 kg i.e. 4.2 kg dry resin. 48.2 kg permeate solution which had passed the membranes with a dry content of 2.8%, 1.35 kg dry weight, had thus been separated from the original amount of 5.6 kg. The inlet pressure was 10 bar the temperature 40° C. and the filtration was performed during 1.5 hours.

The total added amount of free formaldehyde was 0.390 kg of which 0.230 kg was found in the concentrate and 0.171 kg was found in the permeate. Based on dry weight resin the concentrate contained 5.47% free formaldehyde and the permeate 12.7% compared with the content of 6.9% in the original product.

EXAMPLE 3

Example 2 was repeated with 83.0 kg resin solution with 8.9% dry weight. After 2 hours at 40° C., 10 bar pressure, 24.2 kg concentrate with the dry content of 23.4% and 58.8 kg permeate with dry content 2.95% were achieved. 0.510 kg free formaldehyde was added and 0.280 kg was found in the concentrate and 0.241 kg was found in the permeate. Based on dry weight resin the concentrate contained 4.9% free formaldehyde and the permeate 13.9% compared with the content of 6.9% in the original product.

EXAMPLE 4

Concentrated resins from example 1 were tested as wet strength agents on a pilot paper machine. The pulp consisted of 50% bleached softwood and 50% hardwood with 24°SR. pH was 4.5.

| | | Results: | |
|---|---|---|---|
| Product | Added Amount % | Wet strength breaking length km | Wet Strength % |
| Original | 0.5 | 0.93 | 13.7 |
| | 1.0 | 1.22 | 16.9 |
| | 1.5 | 1.41 | 18.6 |
| | 3.0 | 1.63 | 19.7 |
| Concentrate | 0.5 | 1.06 | 15.4 |
| | 1.0 | 1.41 | 18.8 |
| | 1.5 | 1.65 | 21.7 |
| | 3.0 | 1.82 | 22.0 |

EXAMPLE 5

55.8 kg of a permeate solution, being a mixture of permeates obtained after several repetitions of Example 1, with a dry content of 8.8%, i.e. 4.92 kg was charged to a filtration unit for reverse osmosis. Thin film composite membranes were used. The process was carried out during 2 hours at 40 bar and 40° C. 20.8 kg RO-concentrate with a dry content of 23.0% i.e. 4.78 kg dry resin and 35 kg RO-permeate with a dry content of 0.2%, i.e. 0,07 kg were collected.

Total added amount of free formaldehyde was 0.930 kg of which 0.413 kg was found in the RO-concentrate and 0.532 kg was found in the RO-permeate.

Synthesis of a urea-formaldehyde resin was performed where the RO-concentrate was one of the raw materials. Extra urea and formaldehyde and other ingredients were added according to standard recipie. The amount of RO-concentrate was 20% dry weight of the total dry weight added.

The product achieved had standard properties and gave good wet strength results.

EXAMPLE 6

61.6 kg of a permeate solution, with a dry content of 8.6% i.e. 5.3 kg dry weight was added to a RO-filtration unit. Thin film composite membranes were used. The process was carried out during 2.5 hrs at 40 bar and 40° C.

19.0 kg RO-concentrate with a dry content of 25% i.e. 4.8 kg dry resin and 42.6 kg RO-permeate with a dry content of 1.17% i.e. 0.5 kg were achieved.

This RO-concentrate was used as raw material for new synthesis. Some 24% of the total added amount of chemicals for the new synthesis was contributed from the RO-concentrate. The new resin had standard properties and gave good wet strength results.

EXAMPLE 7

37.1 kg of a solution of an anionic urea-formaldehyde resin containing sulphur molecules at a dry weight of 21% i.e. 7.8 kg was run through an ultrafiltration plant. After 4 hrs at 10 bar and a temperature of 40° C., 22.8 kg of a concentrated solution with 29.4% dry weight, i.e. 6.70 kg and 14.3 kg permeate with a dry content of 7.6% were collected i.e. 1.1 kg dry weight.

Some 30% of the added sulphur groups were parts of unwanted monomeric byproducts with a negative impact on the final wet strength effect of the resin.

The total added amount of monomers containing sulphur was 0.122 kg. The concentrate contained 0.06 kg and the permeate 0.062 kg of monomers containing sulphur. Based on dry weight resin the original product contained 1.56%, the concentrate 0.89% and the permeate 5.6%.

These products were also tested for formaldehyde emission from cellulose fibers according to a standard procedure.

| Sample | Emission of formaldehyde in μg/mg dry product |
| --- | --- |
| original product | 92 |
| concentrate | 61 |

EXAMPLE 8

The relation between added amount of free formaldehyde to the stock together with urea formaldehyde resin and amount of formaldehyde emitted in the drying air at a paper machine was tested on a pilot machine.

The white water system was very closed and the test was performed at status quo.

| Added amount w.s. agent % | Added amount of free $CH_2O$ to the stock mg/min | Found amount of $CH_2O$ in the air ppm |
| --- | --- | --- |
| 1.6 | 21 | 0.49 |
| 2.0 | 55 | 0.61 |
| 2.4 | 68 | 0.96 |
| 2.5 | 93 | 1.24 |
| 3.0 | 135 | 1.34 |

The same urea-formaldehyde resin but with different contents of free formaldehyde was tested. A contained 7.14% free formaldehyde based on dry weight resin and product B contained 2.25% free formaldehyde based on dry weight.

| Product | Added amount % dry weight | Added amount free formaldehyde mg/min | Found amount of formaldehyde in the white water ppm | in the air ppm |
| --- | --- | --- | --- | --- |
| A | 2.44 | 55.8 | 43 | 1.08 |
| B | 2.50 | 17.5 | 15 | 0.41 |

We claim:

1. A method for the separation and reuse of synthetic water-soluble resins of different molecular weight produced in a polymerization zone, said water-soluble resins being selected from the group consisting of urea-formaldehyde resins, melamine-formaldehyde resins and polyamidoamine-epichlorohydrin resins, which method comprises
   (1) charging an aqueous solution of said water-soluble synthetic resin to an ultrafiltration unit,
   (2) in said ultrafiltration unit effecting separation of said solution into
      (a) a concentrate solution which mainly comprises polymers of high molecular weight, and
      (b) an aqueous permeate solution which mainly comprises polymers of low molecular weight, monomers and byproducts,
   (3) the separation according to step (2) being carried out so that at least 5 percent by weight of the original dry resin content is separated off in said permeate solution, and
   (4) recirculating said separated permeate solution to the polymerization zone for further polymerization.

2. A method according to claim 1 wherein said concentrate solution from the ultrafiltration unit is recirculated to the ultrafiltration unit via a feed tank and made to pass the unit a number of times until a desired degree of concentration is obtained.

3. A method according to claim 2 wherein the permeate is upgraded before recirculation.

4. A method according to claim 3 wherein the permeate is subjected to reverse osmosis and the concentrated solution obtained after the reverse osmosis is recirculated to a polymerization step.

5. A method according to claim 4 wherein the synthetic water-soluble resin is a urea-formaldehyde resin.

6. A method according to claim 3 wherein the synthetic water-soluble resin is a urea-formaldehyde resin.

7. A method according to claim 6 wherein the synthetic water-soluble resin is a urea-formaldehyde resin.

8. A method according to claim 2 wherein a formaldehyde binding agent is added to the aqueous solution charged to the ultrafiltration membrane unit.

9. A method according to claim 2 wherein a formaldehyde binding agent is added to the permeate which is then subjected to reverse osmosis.

10. A method according to claim 1 wherein said permeate solution is upgraded before recirculation to a polymerization zone.

11. A method according to claim 10 wherein said permeate solution from the ultrafiltration unit is subjected to reverse osmosis treatment and the concentrated solution resulting from the reverse osmosis treatment is recirculated to a polymerization step.

12. A method according to claim 1 wherein said water-soluble resin is a urea-formaldehyde resin.

13. A method according to claim 12 wherein a formaldehyde binding agent is added to the aqueous solution charged to the ultrafiltration membrane unit.

14. A method according to claim 12 wherein a formaldehyde binding agent is added to the permeate solution and then subjected to reverse osmosis.

15. A method according to claim 14 wherein a formaldehyde binding agent is added to the permeate which is then subjected to reverse osmosis.

16. A plant for the production and separation of water-soluble resins of different molecular weight selected from the group consisting of urea-formaldehyde resins, melamine-formaldehyde resins and polyamidoamine-epichlorohydrin resins which comprises
(a) a polymerization reactor having an inlet for materials to be polymerized and an outlet for the products of polymerization including said water-soluble resins,
(b) an ultrafiltration unit containing an inlet for the products of polymerization from said polymerization reactor, said ultrafiltration unit being provided with a first outlet for concentrate solution mainly comprising polymers of high molecular weight and a second outlet for a permeate solution containing polymers of low molecular weight, monomers and byproducts,
(c) a reverse osmosis unit having an inlet and outlet,
(d) means for conducting the permeate solution from the ultrafiltration unit to said reverse osmosis unit, and
(e) means for conducting said concentrate from the outlet of said osmosis unit to the inlet of said polymerization reactor.

* * * * *